United States Patent
Snyder

(10) Patent No.: US 8,375,013 B2
(45) Date of Patent: Feb. 12, 2013

(54) SERVER-CONTROLLED TESTING OF HANDHELD DEVICES

(75) Inventor: Kevin H. Snyder, Pacifica, CA (US)

(73) Assignee: Oracle International Corporation, Redwood Shores, CA (US)

( * ) Notice: Subject to any disclaimer, the term of this patent is extended or adjusted under 35 U.S.C. 154(b) by 902 days.

(21) Appl. No.: 11/435,638

(22) Filed: May 17, 2006

(65) Prior Publication Data

US 2007/0288552 A1 Dec. 13, 2007

(51) Int. Cl.
*G06F 7/00* (2006.01)
*G06F 17/30* (2006.01)

(52) U.S. Cl. ........ 707/705; 707/758; 707/770; 707/781; 709/201; 709/220; 709/223

(58) Field of Classification Search .................. None
See application file for complete search history.

(56) References Cited

U.S. PATENT DOCUMENTS

| | | | | |
|---|---|---|---|---|
| 5,497,379 A * | 3/1996 | Whetsel | | 714/731 |
| 5,809,108 A * | 9/1998 | Thompson et al. | | 379/10.02 |
| 6,182,245 B1 * | 1/2001 | Akin et al. | | 714/38 |
| 6,427,063 B1 * | 7/2002 | Cook et al. | | 434/350 |
| 6,502,102 B1 * | 12/2002 | Haswell et al. | | 1/1 |
| 6,606,479 B2 * | 8/2003 | Cook et al. | | 434/350 |
| 6,625,648 B1 * | 9/2003 | Schwaller et al. | | 709/224 |
| 6,701,514 B1 * | 3/2004 | Haswell et al. | | 717/115 |
| 6,779,140 B2 * | 8/2004 | Krech et al. | | 714/718 |
| 6,804,709 B2 * | 10/2004 | Manjure et al. | | 709/220 |
| 6,859,922 B1 * | 2/2005 | Baker et al. | | 717/125 |
| 6,895,539 B1 * | 5/2005 | Aragona | | 714/724 |
| 6,907,546 B1 * | 6/2005 | Haswell et al. | | 714/38.11 |
| 6,934,934 B1 * | 8/2005 | Osborne et al. | | 717/126 |
| 6,950,850 B1 * | 9/2005 | Leff et al. | | 709/203 |
| 6,993,747 B1 * | 1/2006 | Friedman | | 717/124 |
| 7,000,224 B1 * | 2/2006 | Osborne et al. | | 717/125 |
| 7,080,137 B2 * | 7/2006 | Brault | | 709/224 |
| 7,103,357 B2 * | 9/2006 | Kirani et al. | | 455/426.1 |
| 7,127,322 B2 * | 10/2006 | Kreidler et al. | | 700/169 |
| 2002/0107809 A1 * | 8/2002 | Biddle et al. | | 705/59 |
| 2002/0116507 A1 * | 8/2002 | Manjure et al. | | 709/229 |
| 2003/0005375 A1 * | 1/2003 | Krech et al. | | 714/724 |
| 2003/0074418 A1 * | 4/2003 | Coker | | 709/217 |
| 2003/0110430 A1 * | 6/2003 | Bailis et al. | | 714/725 |
| 2003/0172145 A1 * | 9/2003 | Nguyen | | 709/223 |
| 2003/0233601 A1 * | 12/2003 | Vaid et al. | | 714/42 |
| 2004/0107415 A1 * | 6/2004 | Melamed et al. | | 717/124 |
| 2004/0258053 A1 * | 12/2004 | Toporek et al. | | 370/352 |
| 2005/0005198 A1 * | 1/2005 | Vakrat et al. | | 714/37 |
| 2005/0071745 A1 * | 3/2005 | Ehrich et al. | | 715/500.1 |
| 2005/0071757 A1 * | 3/2005 | Ehrich et al. | | 715/513 |
| 2005/0097086 A1 * | 5/2005 | Merchant | | 707/3 |
| 2005/0102580 A1 * | 5/2005 | House et al. | | 714/38 |
| 2005/0125401 A1 * | 6/2005 | Carr et al. | | 707/5 |
| 2005/0154742 A1 * | 7/2005 | Roth et al. | | 707/100 |
| 2005/0182761 A1 * | 8/2005 | Kato | | 707/3 |
| 2005/0188262 A1 * | 8/2005 | Rosenman et al. | | 714/25 |
| 2005/0193269 A1 * | 9/2005 | Haswell et al. | | 714/38 |
| 2005/0246716 A1 * | 11/2005 | Smith et al. | | 719/315 |
| 2005/0268171 A1 * | 12/2005 | House et al. | | 714/32 |

(Continued)

*Primary Examiner* — Angelica Ruiz
(74) *Attorney, Agent, or Firm* — Kraguljac Law Group, LLC

(57) ABSTRACT

Systems, methodologies, media, and other embodiments associated with testing of an application (e.g., software application) on a handheld device are described. Testing can be initiated by the handheld device, however, the testing regimen is controlled by a server. Logic associated with testing is stored on the server with statements being provided by the server to the handheld device.

28 Claims, 8 Drawing Sheets

U.S. PATENT DOCUMENTS

| | | | |
|---|---|---|---|
| 2006/0036941 A1* | 2/2006 | Neil | 715/526 |
| 2006/0047665 A1* | 3/2006 | Neil | 707/10 |
| 2006/0059253 A1* | 3/2006 | Goodman et al. | 709/223 |
| 2006/0211415 A1* | 9/2006 | Cassett et al. | 455/423 |
| 2006/0212798 A1* | 9/2006 | Lection et al. | 715/513 |
| 2007/0093929 A1* | 4/2007 | Kreidler et al. | 700/169 |
| 2007/0101196 A1* | 5/2007 | Rogers et al. | 714/38 |
| 2007/0178843 A1* | 8/2007 | Singh et al. | 455/67.11 |
| 2007/0234293 A1* | 10/2007 | Noller et al. | 717/124 |
| 2007/0234314 A1* | 10/2007 | Godwin et al. | 717/136 |
| 2007/0239397 A1* | 10/2007 | Bourne et al. | 702/183 |
| 2007/0240118 A1* | 10/2007 | Keren | 717/124 |

* cited by examiner

US 8,375,013 B2

SERVER-CONTROLLED TESTING OF HANDHELD DEVICES

BACKGROUND

As part of the development process, software applications are tested in order to determine resiliency in various test scenarios. With the ever-increasing use of computer systems in, for example, embedded environments, the ability to adequately test software applications has proven difficult.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
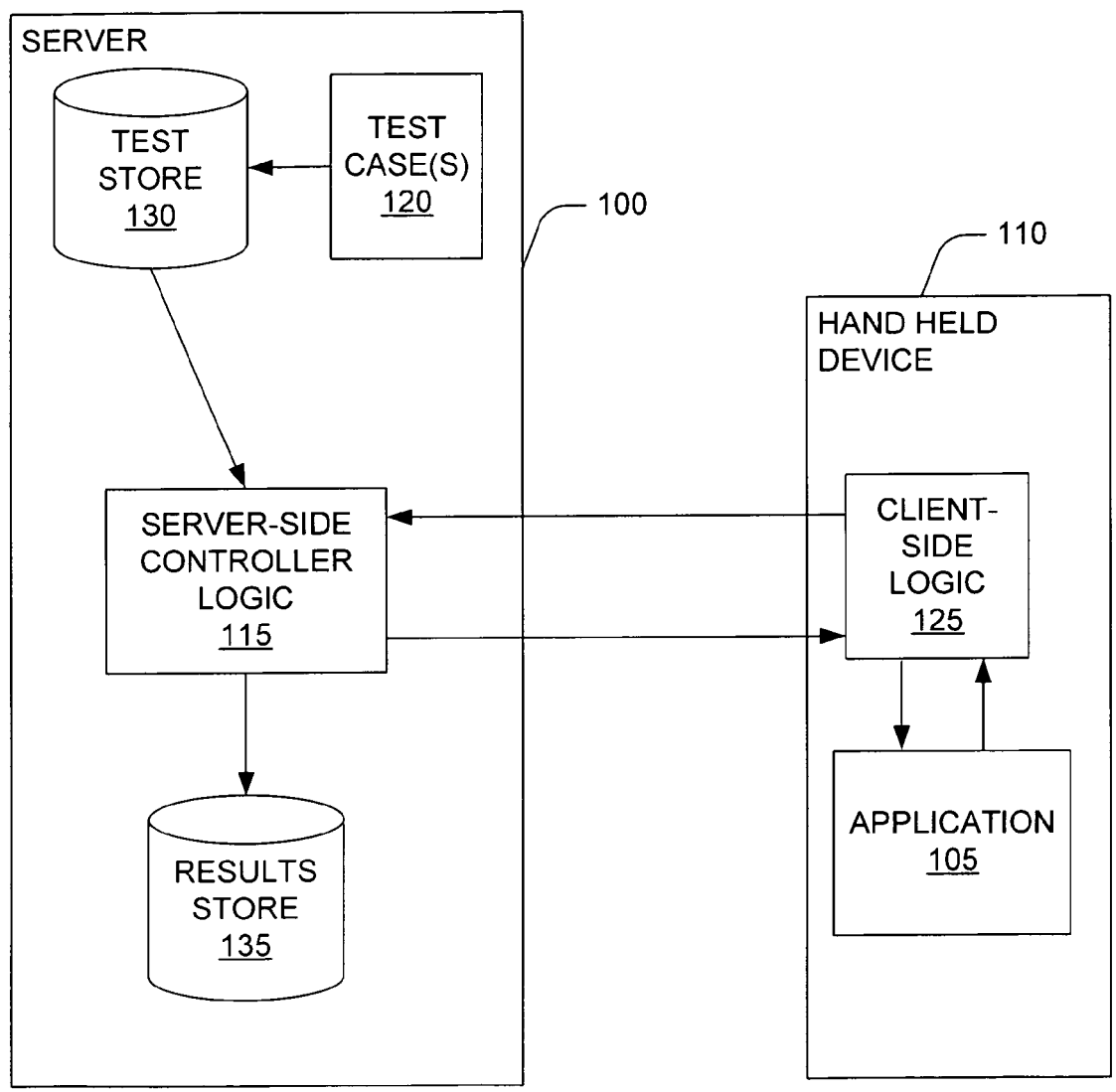
FIG. 1 illustrates one embodiment of an example server.

Example systems, methods, computer-readable media, software and other embodiments are described herein that relate to testing of an application (e.g., software application) on a handheld device. Testing is initiated by the handheld device (e.g., put in "test mode"); however, the testing regimen is controlled by a server. In one embodiment, business logic associated with testing is stored on the server with test statements/instructions being provided by the server to the handheld device. Thus rather than having test logic customized and loaded on each different type of handheld device, the present business logic is moved to a server and configured to be shared by multiple device platforms. This can help reduce the amount of logic coding associated with each handheld device.

In one embodiment, based upon identification information provided by a client-side logic of the handheld device, a server-side controller logic can select and provide a plurality of test cases to the client-side logic with the test cases forming a test suite. The client-side logic interacts with the application (e.g., via application program interface(s) APIs) and provides results of the test cases to the server-side controller logic. Thereafter, the server-side controller logic can compare the results of the test cases with expected results in order to determine the effectiveness of the application, for example, as to how it executes on the particular handheld device. In one example, the test suite is interruptible allowing the testing to be paused and resumed or aborted.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks and so on. Volatile media may include, for example, semiconductor memories, dynamic memory and the like. Common forms of a computer-readable medium include, but are not limited to, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

FIG. 1 illustrates one embodiment of a server 100 that facilitates testing of an application 105 (e.g., software application) of a handheld device 110. For example, the application 105 can be a software application such as a mobile database. In general, the server 100 and the handheld device 110 are remote devices from each other.

With conventional test systems, testing of a software application on a handheld device is directly controlled via the handheld device. A test case (e.g., single script) could be received remotely (e.g., from a server) or received locally (e.g., from a local computer-readable medium), however, test logic associated with execution of the test case is resident on the handheld. A user interface of the handheld is generally employed to control the test case (e.g., begin, end, cancel etc.). Thus, conventional test systems can be difficult and inflexible because different handheld devices would require customized interfaces and customized test logics to perform testing.

In one embodiment of the server 100, a server-side controller logic 115 can be configured to control a test regimen of the application 105. For example, the server-side controller logic 115 can provide a test case 120 to a client-side logic 125 (e.g., listener) of the handheld device 110. The test case 120 can include one or more statements (e.g., SQL statements, commands etc.) to exercise functionality of the application 105 and/or to help determine the operating behavior of the application 105 as it executes on the handheld device 110. Once the test case 120 is executed, the client-side logic 125 can provide a result associated with the test case 120 to the server-side controller logic 115. In one embodiment, one or more test cases 120 and can be stored in a test store 130 on the server 100 where test cases 120 can then be selected based on, for example, the application being tested, and/or other identification information.

Thus, the server 100 and handheld device 110 can form a test framework in which testing is initiated by the handheld device 110, however, the testing regimen is controlled by the server 100. As such, the client-side logic 125 can be reduced in size (e.g. reduced code) and functionality so as to require less code development time and less processing power from the handheld device. In one embodiment, as each test case can be sent individually to the handheld device 110, local storage on the handheld device 110 can be reduced (e.g., test suite is not stored on the handheld device 110). In one example, the client-side logic 125 can be configured to initiate testing, for example, by sending a start signal (e.g., message) to the server-side controller logic 115, interface with the server 100 to receive test instructions, interact with the application 105 being tested on the handheld device 110 to pass on the test instructions, and return the test results to the server 100. Functions associated with controlling a test, like the logic for determining what test case 120 needs to be run, determining what order test statements need to be run in, and parsing the test scripts, are moved to the server-side controller logic 115.

In one example, the server-side controller logic 115 is independent of the platform of the handheld device 110. Thus, it is unnecessary to recompile the server-side controller logic 115 for variations in handheld devices 115 and/or handheld device platforms.

In one embodiment, the client-side logic 125 is platform and/or application specific. The client-side logic 125 can perform initiation and/or instantiation of the application 105, if necessary. For example, the client-side logic 125 can open a connection with the application 105 and can communicate with the application 105, for example, via application program interface(s) APIs.

Once initiation associated with the application 105, if any, has been performed by the client-side logic 125, the client-side logic 125 can determine whether any test case(s) 120 are available. In one example, the client-side logic 125 inquires by polling the server 100 (e.g., a particular queue) to determine whether any test cases 120 are available.

In one example, test cases 120 can be application and/or platform dependent. For example, the server-side controller logic 115 can receive identification information (e.g., device type, platform, application name etc.) from the client-side logic 125. The server-side controller logic 115 can employ the identification information to determine test case(s) 120 to provide to the client-side logic 125. In another example, the client-side logic 125 can selectively determine whether available test cases 120 are intended for the handheld device 110 and, more particularly, the application 105.

When an appropriate test case 120 is available, the client-side logic 125 can receive (e.g., download) the test case 120. The test case 120 can include information for testing the application 105, for example, statement(s), command(s) and/or data. The client-side logic 125 can provide the testing information (e.g., statement(s), command(s) and/or data) to the application 105 based on the test case 120. The client-side logic 125 can receive test results of the testing information from the application 105.

Thereafter, the client-side logic 125 can provide the test results to the server-side controller logic 115. The server-side controller logic 115 can store the test results in a result store 135. Subsequently, the test results can be used, for example, by a comparator logic, as discussed in greater detail below, to analyze the test results.

Figure 2:
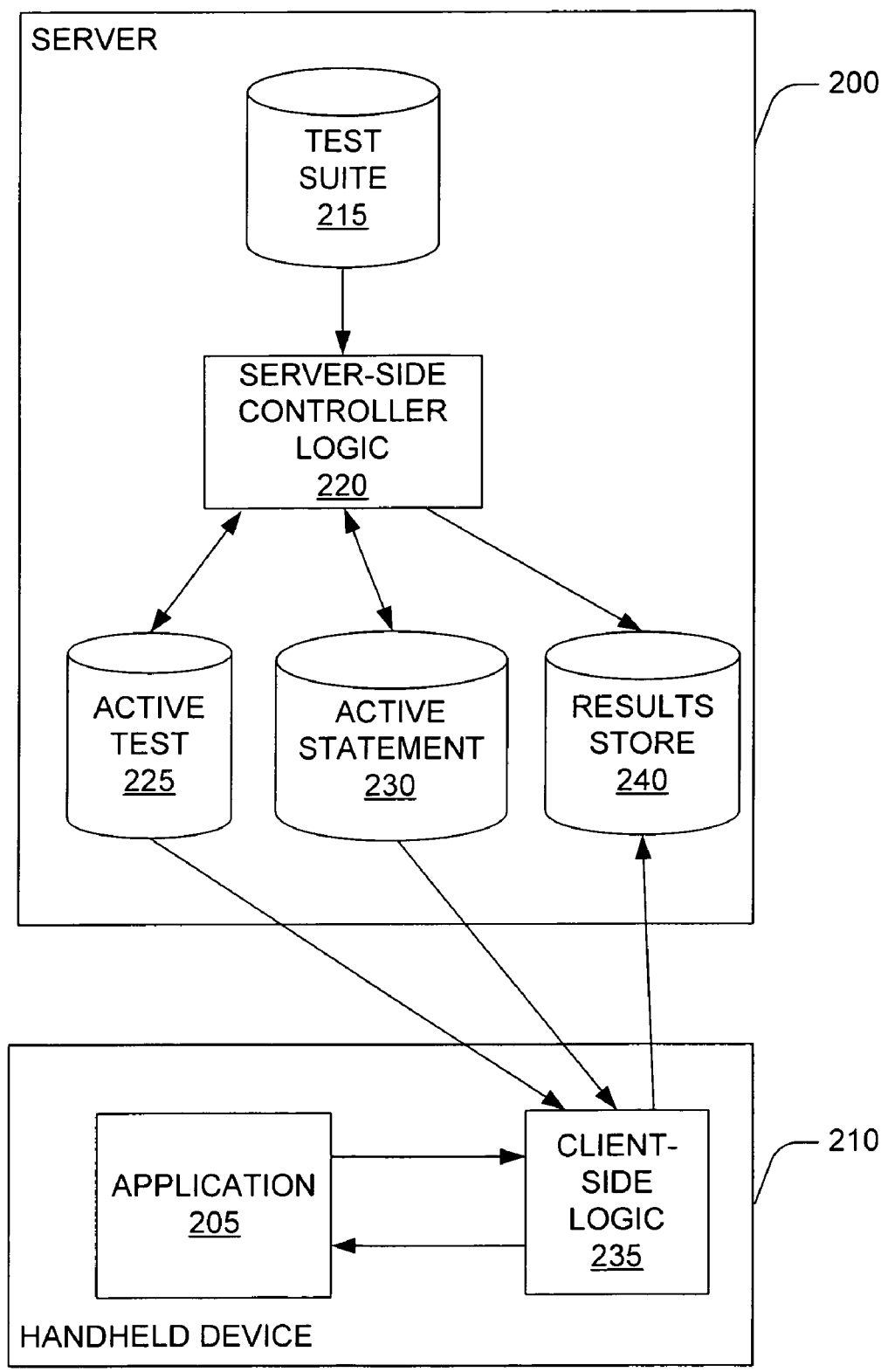
FIG. 2 illustrates one embodiment of another example server.

FIG. 2 illustrates one embodiment of a server 200 that facilitates testing of an application 205 (e.g., software application) of a handheld device 210. Testing is based on a test suite 215 that includes one or more test cases. Each of the test cases can include one or more statements (e.g., SQL statements, data, commands etc.) to test functionality of the application 205. Different test cases can be created for different handheld devices and/or different applications being tested on those handheld devices.

A server-side controller logic 220 controls execution of the test suite 215 on the handheld device 210. For example, based on the type of handheld device 215, the application 205 to be tested, and/or other identification information, the server-side controller logic 220 can identify an appropriate first test case and a first statement associated with the test case from the test suite 215. In one example implementation, the server-side controller logic 220 can copy the first test case into an active test 225 (e.g., table) and the first statement into an active statement 230 (e.g., table) in preparation for a test.

At some point, the handheld device 210 (and/or an operator of the handheld device) will wish to test one or more functions of the application 205 to determine that the application 205 executes properly on the handheld device. In this regard, a client-side logic 235 is provided to initiate/request a test from the server 200 and can be configured to receive the active test case 225 and the active statement 230, for example, by polling the active test 225 and/or active statement 230. Based on the active statement 230, the client-side logic 235 can provide test information to the application 205. As the testing executes and/or upon completion of the testing, the client-side logic 235 can receive associated results (e.g. output data generated from the test input data) from the application 205 and return the results to be stored in a results store 240 (e.g., table) of the server 200.

In one embodiment, once the first statement is received from the active statement 230 by the client-side logic 235, the server-side controller logic 220 successively loads the active statement 230 with additional statements, if any, of the active test 225. Once the last statement of the active test 225 has been loaded, the server-side controller logic 220 can load successive tests and associated statements, if any, until the test suite 215 has been completed and/or testing is interrupted.

Figure 3:
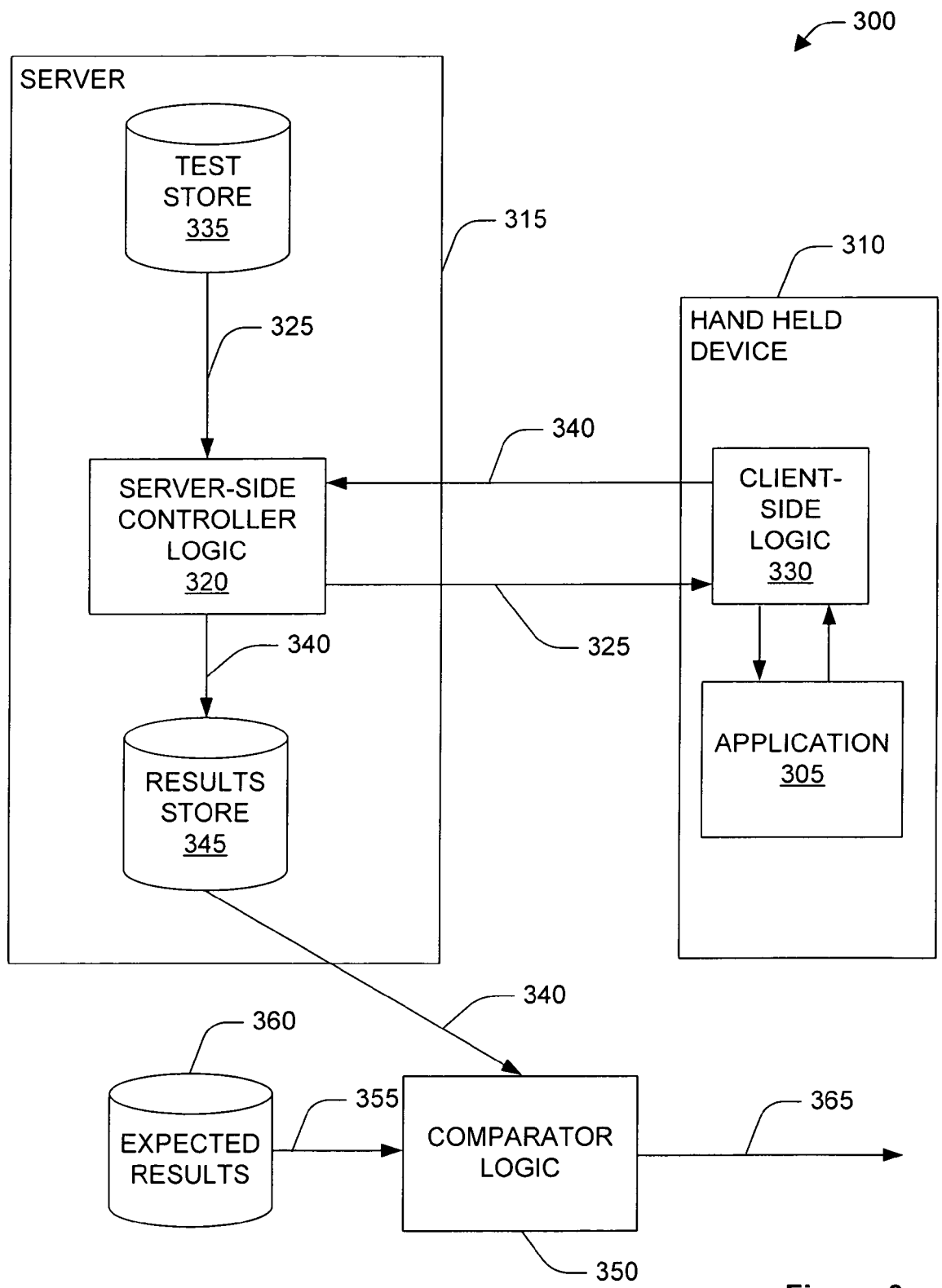
FIG. 3 illustrates one embodiment of an example server-controlled test system.

FIG. 3 illustrates an embodiment of a server-controlled test system 300 that facilitates testing of an application 305 (e.g., software application) of a handheld device 310.

The system 300 includes a server 315 having a server-side controller logic 320 that controls a test regimen of the application 305. The server-side controller logic 320 can provide a test case 325 to a client-side logic 330 of the handheld device 310. The test case 325 can include one or more statements (e.g., SQL statements, data, commands etc.) to exercise functionality of the application 305 and can be stored in a test store 335. The client-side logic 330 can provide a result 340 associated with the test case 325 to the server-side controller logic 320. The server-side controller logic 320 can store the results 340 in a results store 345.

Thereafter, a comparator logic 350 can compare the stored results with an expected result 355, for example, stored in an expected results store 360 (e.g., table). The comparator logic 350 can provide a signal 365 based on the comparison of the stored results with the expected results 355. For example, the signal 365 can be a flag and/or message that provides an indication of whether the stored results were substantially the same as the expected results 355.

Those skilled in the art will recognize that while the comparator logic 350 is illustrated separate from the server 315, the comparator 350 can be a component of the server 315 and/or the server-side controller logic 320.

Figure 4:
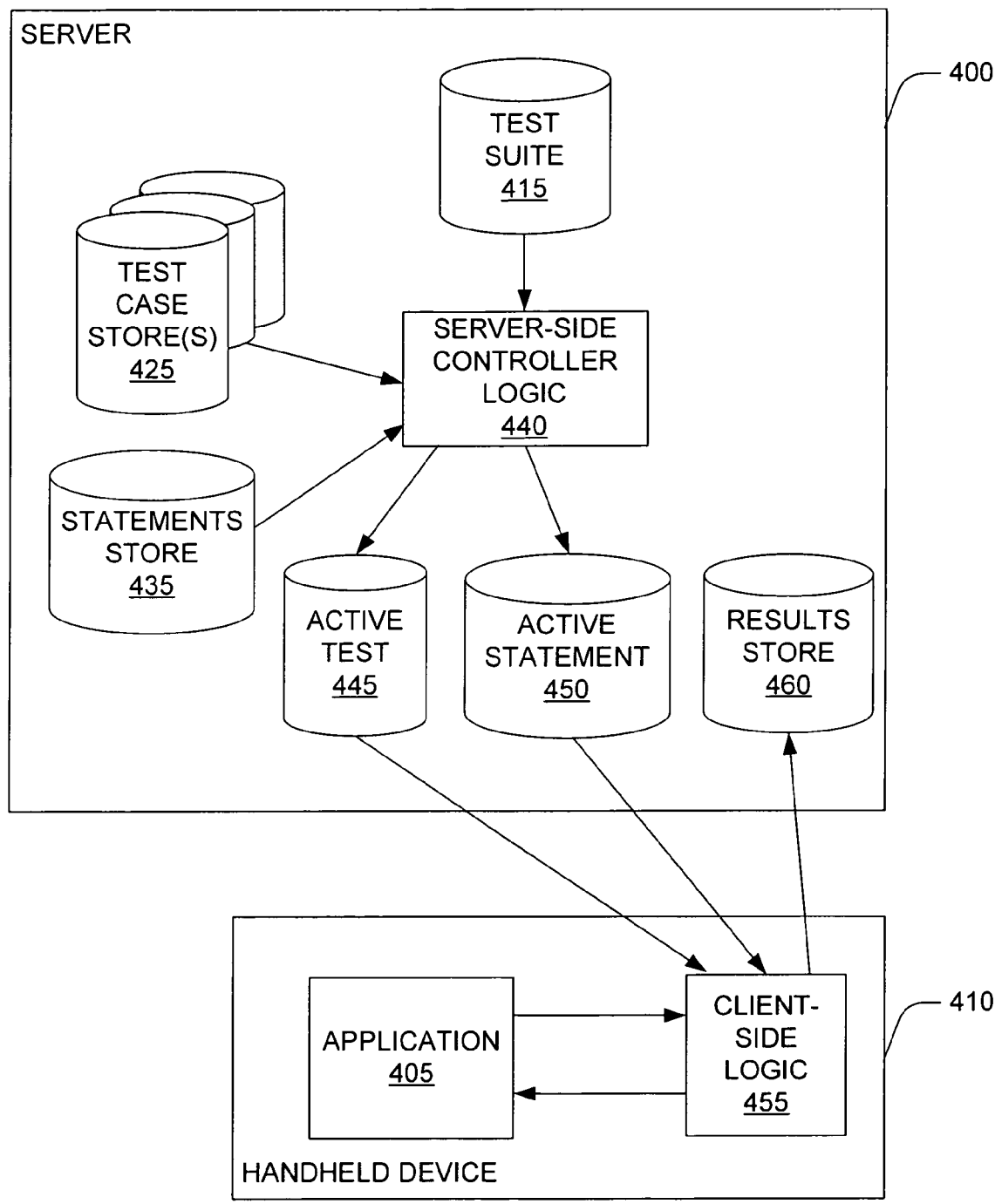
FIG. 4 illustrates one embodiment of another example server.

FIG. 4 illustrates another embodiment of a server 400 that facilitates testing of an application 405 (e.g., software application) of a handheld device 410. Testing is based on a test suite 415 that identifies one or more test cases stored in test case stores 425 (e.g., tables). A test case can identify one or more statements (e.g., SQL statements, commands etc.) to test functionality of the application 405. The statements can be stored in a statements store 435 (e.g., table). In one embodiment, the statements store 435 contains the definition of reusable statements for testing of handheld devices 410.

Thus, in one embodiment, the test suite 415 can be generated from one or more test cases stored in the test case store(s) 425. Further, each test case can be generated from one or more statements stored in the statements store 435.

A server-side controller logic 440 controls execution of the test suite 415. For example, based on the test suite 415, the server-side controller logic 440 can identify a first test case and a first statement associated with the test case. The server-side controller logic 440 can copy the first test case into an active test 445 (e.g., table) and the first statement into an active statement 450 (e.g., table).

A client-side logic 455 can receive the active test case 445 and the active statement 450 (e.g., poll active test 445 and/or active statement 450). In one embodiment, the active test 445 and active statement 450 are transferred to a client-side logic 455 via a synchronization process.

Based on the active statement 450, the client-side logic 455 can provide information 460 (e.g., statement(s), data and/or command(s)) to test the application 405 and receive test results from the application 405. The client-side logic 455 can transmit the test results and/or information associated with the test results to the server 400 where the test results can be stored in a results store 460.

In one embodiment, once the first statement is received from the active statement 450 by the client-side logic 455, the server-side controller logic 440 sequentially loads the active statement 450 with additional statements, if any, of the active test 445. Once the last statement of the active test 445 has been loaded, the server-side controller logic 440 can load successive tests and associated statements, if any, as discussed above.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

It will be appreciated that electronic and software applications may involve dynamic and flexible processes such that the illustrated blocks can be performed in other sequences different than the one shown and/or blocks may be combined or separated into multiple components. Blocks may also be performed concurrently, substantially in parallel, and/or at substantially different points in time. They may also be implemented using various programming approaches such as machine language, procedural, object oriented and/or artificial intelligence techniques. The foregoing applies to all methodologies described herein.

Figure 5:
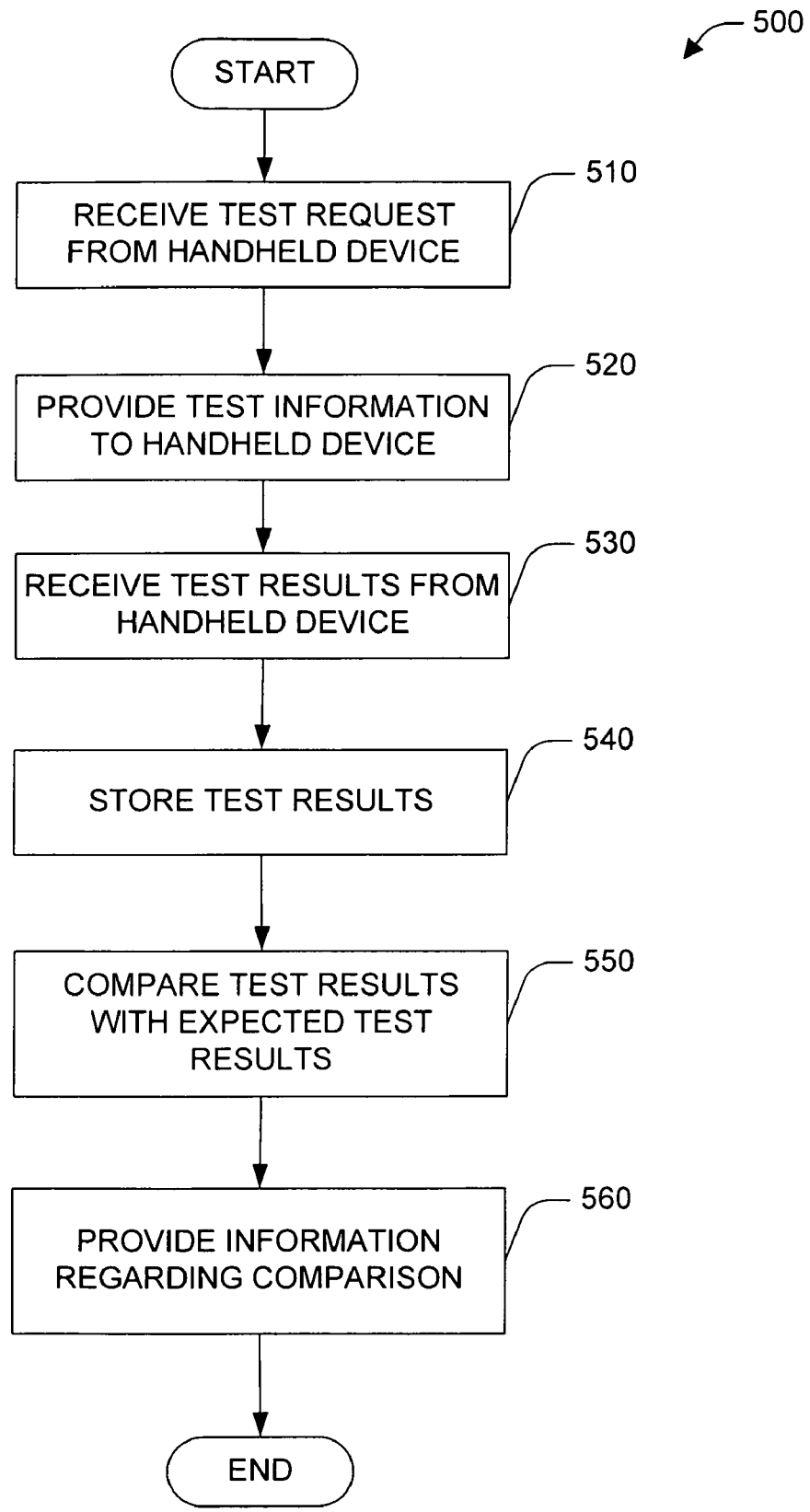
FIG. 5 illustrates one embodiment of an example method for testing an application of a handheld device.

FIG. 5 illustrates an example method 500 for testing, from a server, an application of a handheld device. At 510, a test initiation request is received from a handheld device. At 520, test information (e.g., test scripts) is provided to the handheld device (e.g., to a client-side logic).

At 530, test results are received from the handheld device. At 540, the test results are stored (e.g., in a results store). At 550, the test results are compared with expected test results. At 560, information regarding the comparison is provided and the method 500 ends.

Figure 6:
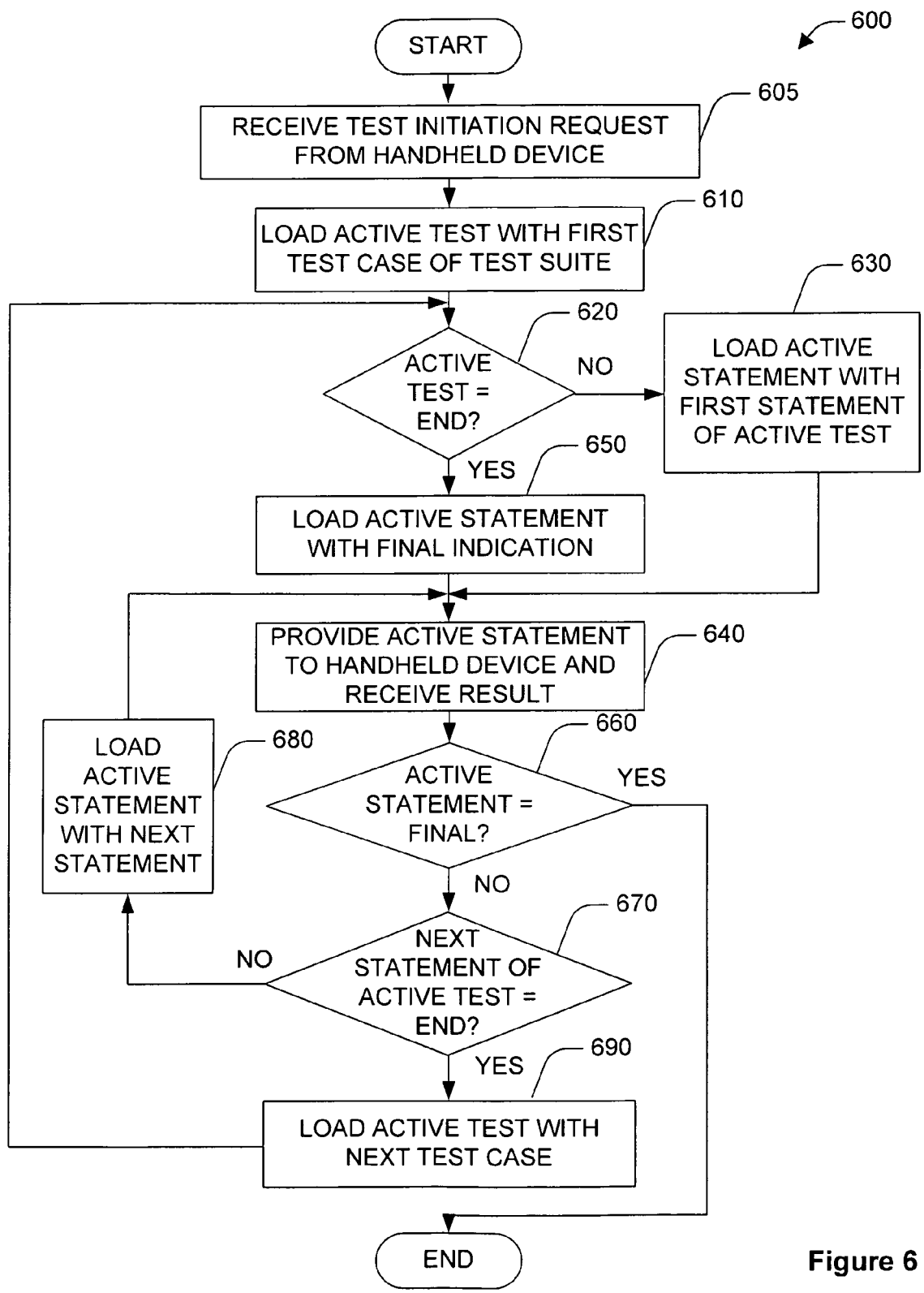
FIG. 6 illustrates one embodiment of another example method for testing an application of a handheld device.

FIG. 6 illustrates another example embodiment of a method 600 for testing an application of a handheld device. At 605, a test initiation request is received from a handheld device. At 610, an active test (e.g., table or file identifying the test) is loaded with a first test case of a test suite. In one embodiment, test associated with the test suite are identified based on information received from the handheld device (e.g., model number, platform, application etc.). At 620, a determination is made as to whether the active test denotes the end of the test suite (e.g., active test identified as "end"). If the determination at 620 is NO, at 630, an active statement (e.g., table or file of test instructions/commands/data) is loaded with a first statement of the active test, and, the method 600 continues at 640.

In one embodiment, the statement can include SQL statements, data and/or commands such as pause, resume and/or interrupt. Thus, testing of the handheld device can be interrupted. For example, with respect to an interrupt command, a client-side logic can exit the application and stop testing. With respect to a pause command, the client-side logic can temporarily suspend testing of the application and poll a server-side controller logic for a resume command. Upon receipt of the resume command, the client-side logic can resume testing of the application.

If the determination at 620 is YES, at 650, the active statement is loaded with a final indication. At 640, the active statement is provided to the handheld device (e.g., via a synchronous message mechanism) and a test result is received. At 660, a determination is made as to whether the active statement is a final indication. If the determination at 660 is YES, the method 600 ends.

If the determination at 660 is NO, at 670, a determination is made as to whether a next statement of the active test is an end indication (e.g., test case completed). If the determination at 670 is NO, at 680, the active statement is loaded with the next statement of the test case and the method 600 continues at 640. If the determination at 670 is YES, at 690, the active test is loaded with the next test case and the method 600 continues at 620.

Figure 7:
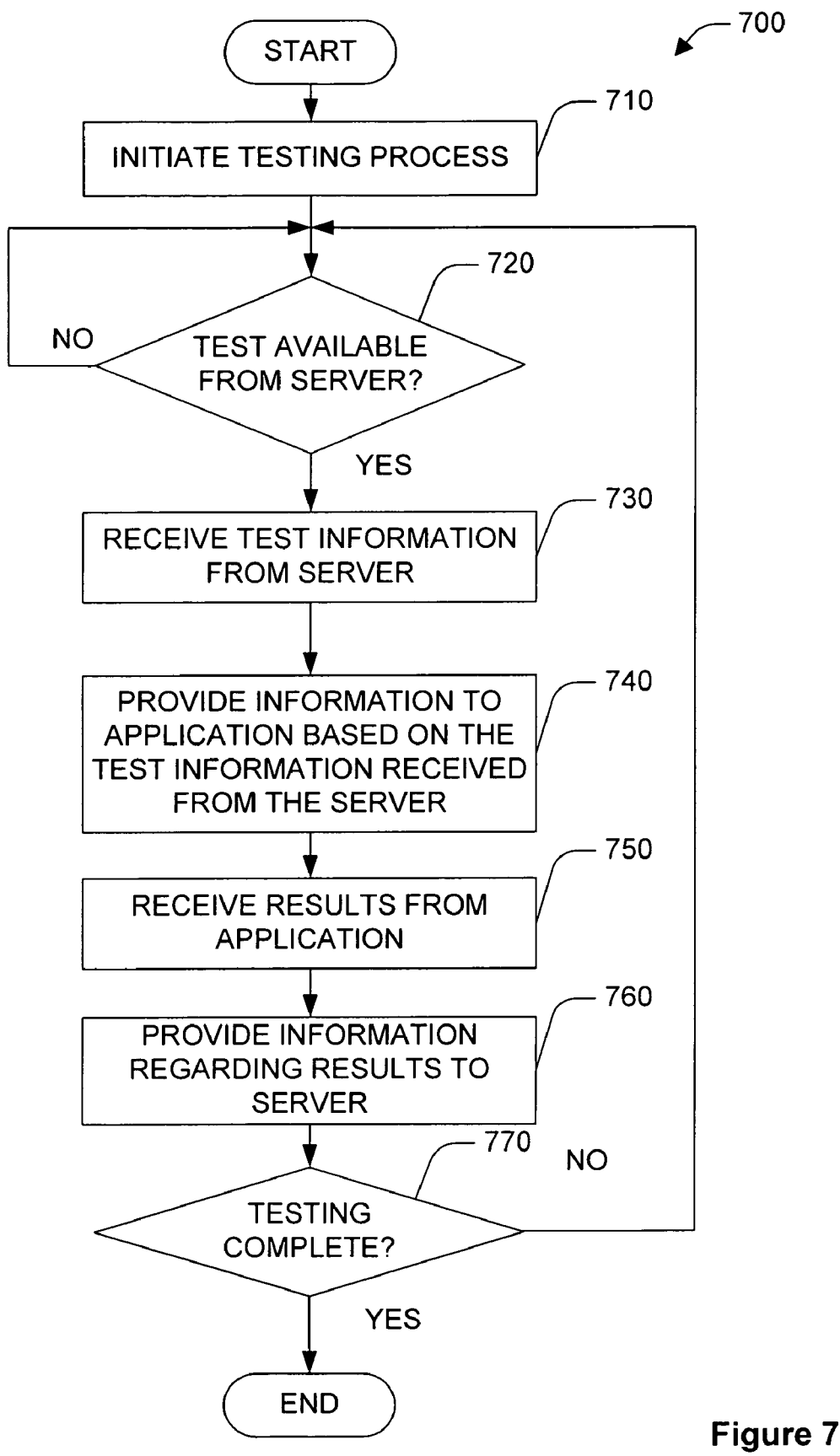
FIG. 7 illustrates one embodiment of another example method for testing an application of a handheld device.

FIG. 7 illustrates an example method 700 for testing an application of a handheld device where the method 700 illustrates what can be performed at the handheld device during a test in conjunction with the server-side method 600. At 710, a testing process is initiated. At 720, a determination is made as to whether test information (e.g., active test and/or active statement) is available from a server. If the determination at 720 is NO, the method 700 continues at 720.

If the determination at 720 is YES, at 730, test information is received (e.g., downloaded) from the server. At 740, information is provided to an application based on the test information received from the server. At 750, results are received from the application. At 760, information regarding the results is provided to the server (e.g., identification information regarding test, platform and/or application). At 770, a determination is made as to whether testing is complete. If the determination at 770 is NO, the method 700 continues at 720. If the determination at 770 is YES, the method 700 ends.

While FIGS. 5-7 illustrate various actions occurring in serial, it is to be appreciated that various actions illustrated in FIGS. 5-7 could occur substantially in parallel. Further, in one example, methodologies are implemented as processor executable instructions and/or operations stored on a computer-readable medium.

Figure 8:
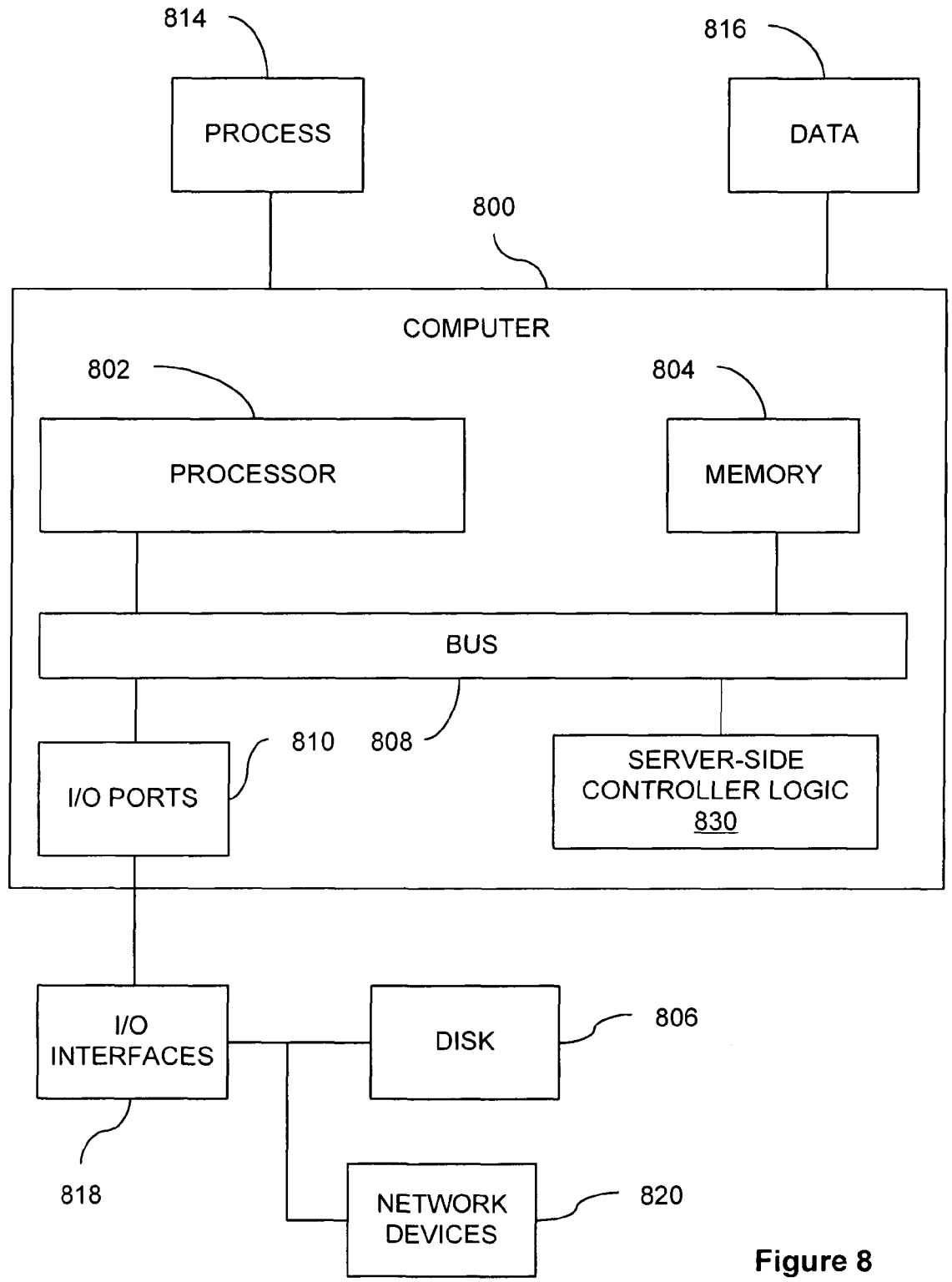
FIG. 8 illustrates one embodiment of an example computing environment in which example systems and methods illustrated herein can operate.

FIG. 8 illustrates an example computing device in which example systems and methods described herein, and equivalents, can operate. The example computing device may be a computer 800 that includes a processor 802, a memory 804, and input/output ports 810 operably connected by a bus 808. In one example, the computer 800 may include a server-side controller logic 830 configured to facilitate testing of an application on a handheld device. The server-side controller logic 830 logic can be implemented similar to the server-side controller logic 115, 220, 320, 440 described in FIGS. 1, 2, 3 and 4, respectively, and/or the other systems and methods described herein.

Generally describing an example configuration of the computer 800, the processor 802 can be a variety of various processors including dual microprocessor and other multiprocessor architectures. The memory 804 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 806 may be operably connected to the computer 800 via, for example, an input/output interface (e.g., card, device) 818 and an input/output port 810. The disk 806 can include, but is not limited to, devices like a magnetic disk drive, a solid state disk drive, a floppy disk drive, a tape drive, a Zip drive, a flash memory card, and/or a memory stick. Furthermore, the disk 806 can include optical drives like a CD-ROM, a CD recordable drive (CD-R drive), a CD rewriteable drive (CD-RW drive), and/or a digital video ROM drive (DVD ROM). The memory 804 can store processes 814 and/or data 816, for example. The disk 806 and/or memory 804 can store an operating system that controls and allocates resources of the computer 800.

The bus 808 can be a single internal bus interconnect architecture and/or other bus or mesh architectures. While a single bus is illustrated, it is to be appreciated that computer 800 may communicate with various devices, logics, and peripherals using other busses that are not illustrated (e.g., PCIE, SATA, Infiniband, 1394, USB, Ethernet). The bus 808 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 800 may interact with input/output devices via i/o interfaces 818 and input/output ports 810. Input/output devices can include, but are not limited to, a keyboard, a microphone, a pointing and selection device, cameras, video cards, displays, disk 806, network devices 820, and the like. The input/output ports 810 can include but are not limited to, serial ports, parallel ports, and USB ports.

The computer 800 can operate in a network environment and thus may be connected to network devices 820 via the i/o devices 818, and/or the i/o ports 810. Through the network devices 820, the computer 800 may interact with a network. Through the network, the computer 800 may be logically connected to remote computers. The networks with which the computer 800 may interact include, but are not limited to, a local area network (LAN), a wide area network (WAN), and other networks. The network devices 820 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 820 can connect to WAN technologies including, but not limited to, point to point links, circuit switching networks like integrated services digital networks (ISDN), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A server, comprising:
   a test store configured to store a test comprising an active test case to identify the test and a set of active statements to exercise the functionality of an application and determine the operating behavior of the application, where at least one of the active statements is operable to temporarily suspend testing of the application; and
   a server-side controller logic configured to provide the test to a client-side logic of a handheld device upon request of the client-side logic, the server-side controller logic further configured to receive a result of the test from the client-side logic, and to selectively execute the at least one active statement to temporarily suspend testing of the application.

2. The server of claim 1, where the test comprises business logic associated with functionally testing an application of the handheld device, where the server-side controller logic is configured to control, at least in part, the testing of the application of the handheld device.

3. The server of claim 1, where the server-side controller provides at least two active statements sequentially to the client-side logic.

4. The server of claim 1, where the test is interruptible.

5. The server of claim 1, where the test comprises at least one of a SQL statement, data or a command.

6. The server of claim 1, further comprising a results store configured to store the results received from the client-side logic.

7. The server of claim 6, further comprising a comparator logic for comparing results stored in the results store with expected results, the comparator logic being embodied on a computer-readable medium.

8. The server of claim 1, where the server-side controller logic is independent of a platform of the handheld device and requires no recompilation for changes in the platform of the handheld device.

9. The server of claim 1, where at least one of the active statements is operable to poll the server-side controller logic for a resume command operable to resume testing of the application.

10. A non-transitory computer-readable medium for providing processor executable instructions for causing a computing device to perform a method, the method comprising:
    in response to receiving a request to initiate a test from a remote device and identification information associated with the remote device, selecting one or more tests from a set of tests based on the identification information, the tests being configured to test functionality of an application on the remote device;

forming a test suite with the one or more selected tests including one or more test statements, where the test statements includes a pause command; and controlling execution of the test suite on the remote device by transmitting a test statement including a resume command to the remote device for use by the application during testing, in response to polling for the resume command by the remote device.

11. The computer-readable medium of claim 10, further comprising:

receiving a test result from the remote device;

comparing the test result with an expected test result; and providing information regarding the comparison.

12. The computer-readable medium of claim 10, where the application is a mobile database.

13. The computer-readable medium of claim 10, where the test suite is interruptible.

14. A server comprising:

a test store configured to store one or more tests for testing one or more handheld devices; and a server-side controller logic configured to provide at least one test from the one or more tests to a handheld device upon request of the handheld device based, at least in part, upon identification information received from a client-side logic, where the identification information is at least one of information associated with the application and information associated with a host environment of the application, the server-side controller logic further configured to receive test results of the test from the handheld device;

where the one or more tests have an active test case to identify the test and at least one active statement, and where the at least one active statement is operable to temporarily suspend testing of the application and poll a server-side controller logic for a resume command.

15. The system of claim 14, where the server-side controller logic is independent of a platform of the handheld device and requires no recompilation for changes in the platform of the handheld device.

16. The system of claim 14, where the client-side logic is dependent upon a platform associated with the handheld device.

17. The system of claim 14, where the handheld device comprises the client-side logic configured to request initiation of a test from the server, receive the one or more tests from the server, provide the tests to an application for execution on the handheld device, and provide a result of the tests to the server.

18. A method for testing an application of a handheld device, comprising:

receiving a test initiation request from a handheld device;

providing testing information to the handheld device that causes performance of one or more tests to test functionality of the application on the handheld device in response to receiving the test initiation request, where the test information includes an active test to identify the test and an active statement to provide instructions, and where the active statement includes a pause command; and determining whether the active statement denotes the end of the test suite;

in response to a no determination loading a first statement of the active test, where the first statement of the active test includes a command; and in response to a yes determination loading a final indication; and receiving test results from the handheld device.

19. The method of claim 18, further comprising:

comparing the test results with expected test results; and providing information regarding the comparison.

20. The method of claim 18 being implemented by processor executable instructions provided by a machine-readable medium.

21. A method for testing an application of a handheld device, comprising:

receiving a test initiation request from a handheld device;

determining if the active test denotes an end of the test suite;

in response to determining that the active test does not denote the end of the test suite:

sequentially loading an active test with tests associated with a test suite, where the active test is at least one of a table identifying the test and a file identifying the test;

for each test, sequentially loading an active statement with one or more statements associated with each test;

for each test, providing the active test and active statement to the handheld device; and for each statement, receiving a test result from the handheld device associated with the statement being processed by the application;

in response to determining that the active test does denote the end of the test suite:

loading a final active test with a statement that includes a final indication;

providing the final active test to the handheld device;

receiving the test result from the handheld device associated with the final active test; and identifying that the test result includes a final active statement.

22. The method of claim 21, where the statements comprise at least one of a SQL statement, data or a command.

23. The method of claim 21, where the statements comprise at least one of an interrupt command, a pause command, a resume command or an abort command.

24. The method of claim 21 being implemented by processor executable instructions provided by a machine-readable medium.

25. The method of claim 21, further comprising determining tests associated with the test suite based on identification information received from the handheld device.

26. A non-transitory computer-readable medium for storing processor executable instructions for causing a computing device to perform a method, the method comprising:

initiating a testing process from a handheld device;

determining whether a test is available from a server;

receiving test information from the server based, at least in part, upon identification information received from the handheld device, where the identification information is at least one of information associated with an application and information associated with a host environment of the application, where the test information includes an active test to identify the test and an active statement to provide instructions, where the instructions include a pause command to temporarily suspend testing and poll the server for a resume command;

providing information to the application for testing based on the test information received from the server;

receiving test results from the application as a result of processing the test information; and providing information regarding the test results to the server.

27. The computer-readable medium of claim 26, where determining whether a test is available from the server comprises polling a queue of the server.

28. The computer-readable medium of claim 26, where the application is a mobile database.

\* \* \* \* \*

UNITED STATES PATENT AND TRADEMARK OFFICE
CERTIFICATE OF CORRECTION

PATENT NO. : 8,375,013 B2  
APPLICATION NO. : 11/435638  
DATED : February 12, 2013  
INVENTOR(S) : Snyder Page 1 of 1

It is certified that error appears in the above-identified patent and that said Letters Patent is hereby corrected as shown below:

In the Specification

In column 3, line 20, delete "servelet," and insert -- servlet, --, therefor.

Signed and Sealed this  
First Day of September, 2015

Michelle K. Lee  
*Director of the United States Patent and Trademark Office*